US005589590A

United States Patent [19]

Ledon et al.

[11] Patent Number: 5,589,590

[45] Date of Patent: Dec. 31, 1996

[54] PROCESS FOR THE PREPARATION OF CYCLODEXTRINS OR OTHER COMPOUNDS CAPABLE OF PRODUCING CLATHRATES WITH A GAS

[75] Inventors: Henry Ledon, Versailles; Pierre Larnicol, Chalon-sur-Saone; Marie-Jeanne Desmurs, Saint Gengoux le National; Michel Dupont, Chagny, all of France

[73] Assignee: Chemoxal, Paris, France

[21] Appl. No.: 186,238

[22] Filed: Jan. 25, 1994

Related U.S. Application Data

[63] Continuation of Ser. No. 887,046, May 22, 1992, abandoned.

[30] Foreign Application Priority Data

May 27, 1991 [FR] France ................... 91 06325

[51] Int. Cl.$^6$ ........................... C08B 37/16; C07B 63/00
[52] U.S. Cl. ............................. 536/127; 127/34
[58] Field of Search ..................... 536/3, 127; 127/2, 127/9, 15, 23, 24, 34

[56] References Cited

U.S. PATENT DOCUMENTS

| 3,541,077 | 11/1970 | Armbruster | 536/103 |
| 4,303,787 | 12/1981 | Horikoshi et al. | 536/103 |
| 4,670,159 | 6/1987 | Garrett et al. | 585/15 |
| 4,904,306 | 2/1990 | Ammeraal | 536/103 |

FOREIGN PATENT DOCUMENTS

| 2457900 | 12/1980 | France . |
| 2067090 | 7/1981 | United Kingdom . |

OTHER PUBLICATIONS

J. Szejtli in "Cyclodextrins and their Inclusion Complexes", pp. 70–73; 133–143, Budapest, Hungary, 1982.

Szejtli, Cyclodextrin Technology, pp. 165–166 1988 (month unavailable).

F. Cramer et al, "Uber Einschlussverbindungen, XII: Verbindungen von Cyclodextrin mit Gasen", Chemische Berichte, vol. 90, 1957, pp. 2572–2575 (month unavailable).

*Primary Examiner*—Jeffrey C. Mullis
*Attorney, Agent, or Firm*—Oliff & Berridge

[57] ABSTRACT

A process for preparing any substance capable of forming a clathrate with a gas may start from a mixture in solution or in suspension of this substance with other components. This mixture is contacted with a gas to form a clathrate with the substance, a precipitate is collected, and the substance is recovered. The invention is especially useful for purifying α-cyclodextrin.

32 Claims, No Drawings

PROCESS FOR THE PREPARATION OF CYCLODEXTRINS OR OTHER COMPOUNDS CAPABLE OF PRODUCING CLATHRATES WITH A GAS

This is a Continuation of application Ser. No. 07/887,046 filed May 22, 1992, now abandoned.

BACKGROUND OF INVENTION

1. Field of the Invention

This invention relates to a process of preparing cyclodextrins or other compounds capable of producing clathrates with a gas.

2. Description of Prior Art

Cyclodextrins are cyclic oligosaccharides obtained by enzymatic conversion of starch. They correspond to the general structure $(C_6H_{10}O_5/n)$. The three most current cyclodextrins designated $\alpha$, $\beta$ and $\gamma$ respectively comprise 6, 7 and 8 glucose units.

The cyclodextrins have the remarkable property of being able to form inclusion complexes or clathrates with a wide variety of chemical compounds (see Cyclodextrins and their inclusion complexes by J. SZEJTLI, AKADEMIAI KIADO, Budapest 1982).

The association between the compound and the host molecule is based, according to certain authors (see S. M. Hagan, Clathrate Inclusion Compounds, Reinhold Publishing Corporation 1962, p. 23), on the multiple Van der Waals bonds which are formed between the two compounds.

Inclusion may take place in solution or in solid state. However, the inclusion of a molecule in cyclodextrins is generally carried out starting from an aqueous solution or suspension.

The inclusion complex is generally less soluble than cyclodextrin. The inclusion may therefore lead to the precipitation of crystals of complexes also called clathrates.

By placing the clathrate back into solution or by simple heating, the inserted substance may be released.

Calthrates of gases have been known since 1957 (F. CRAMER and F. M. HENGLEIN, Chem. Ber. (1957), 90, 2561–2571, and 2572–2575).

Most gases lead to the formation of inclusion complexes when they are in contact with a solution of cyclodextrin. However, the production of crystals is not always observed. This is the case, for example, for oxygen, nitrogen and carbon monoxide. On the other hand, chlorine, carbon dioxide, nitrous oxide ($N_2O$), xenon, krypton as well as all the light hydrocarbons ($CH_4$, $C_2H_2$, $C_2H_4$, $C_2H_6$, etc . . . ) give clathrates ( see: J. SZEJTLI, Cyclodextrin Technology, Kluwer Academic, Publishers, 1988, p. 165–166).

The cyclodextrins and their acylated, alkylated and glucosilated derivatives, are used for the inclusion of active principles or aromas and perfumes in the pharmaceutical and cosmetic fields, respectively.

A Japanese patent publication [JP62039602 (1987)] describes the production of beta-cyclodextrins complexes and derivatives thereof with carbon dioxide, and their exemplary utilization in the cosmetic field.

Clathrates of the above described gases may be prepared from solutions of cyclodextrins which themselves have been obtained by enzymatic conversion of starch.

The isolation of cyclodextrins as well as their purification was the object of a plurality of works and publications (Dominique DUCHENE, Cyclodextrins and their Industrial Uses, Editions Santé, 1987).

The direct crystallization of cyclodextrins issued from the medium used for the enzymatic conversion of starch gives bad yields. Consequently, many complicated and costly techniques of purification have been developed, such as, for example, chromatography (adsorption on resins or gel).

An appropriate solvent may also be used. In this case, cyclodextrin is precipitated in the medium in the form of cyclodextrin/solvent complex, and it is possible to separate the cyclodextrin from the medium by a known technique, for example, by filtration and centrifugation.

These chromatographic or precipitation techniques mentioned above have substantial disadvantages mainly connected with the use of the solvent. These processes require specific and costly apparatuses for handling the solvent because of its toxicity and flammability, as well as its recycling.

Moreover, the presence of solvent residue in the cyclodextrins is harmful for applications of cyclodextrins, for example, in the pharmaceutical field.

SUMMARY OF INVENTION

The present invention specifically provides cyclodextrins at a lower cost and with a better yield than with presently known methods.

The invention also provides cyclodextrins at a very high state of purity (near 100%), with no traces of solvents or within proportions which are not adverse to their utilization, for example, in the pharmaceutical or nutritional fields.

The invention generally concerns a process for preparing any substance product capable of forming a clathrate with a gas, starting from a mixture of this substance with other components in solution or in suspension, this process comprising a succession of the following steps:

contacting said mixture, preferably in aqueous solution, with a gas, possibly under pressure, until a precipitate of clathrates forms between said substance and the gas, separation of the precipitate of clathrates from the other components remaining in solution in the mother liquors of the initial mixture, for example, by filtration, possible recovery of said substance by extrusion of the gas.

Thus, the process according to the invention provides for obtaining, from a starting mixture having a low concentration of a substance capable of forming a clathrate with a gas, a mixture enriched with the substance as compared with the starting mixture.

The process according to the invention may also be advantageously used for the purification of this substance. Purification may be achieved by repeating the above mentioned cycle of operations (or succession of steps) one or more times starting from the solution containing the substance recovered by extrusion of gas and/or by utilizing another purification process, such as by chromatography, after having carried out at least one cycle of the above described operations.

It goes without saying that the process according to the invention may be carried out again from the mother liquors collected after the step of filtration mentioned above in order to extract a quantity of substance, still present in the initial mixture, and capable of forming a clathrate with a gas.

Exemplary substances capable of forming clathrates with gases, within the scope of the above mentioned process include, but are not limited to, substituted or non-substituted cyclodextrins, or water, hydroquinone and its derivatives, phenol, and dianines.

Other components of the mixture containing the substance intended to be concentrated or purified, are advantageously either substances which do not form clathrates with the gas used or form clathrates which do not precipitate.

Exemplary gases capable of being used include, but are not limited to:

carbon dioxide ($CO_2$), ethylene and nitrous oxide (for the formation of clathrates with the cyclodextrins) and $CO_2$ (particularly advantageous because of its low cost, its great affinity towards cyclodextrins, and its absence of toxicity). $CO_2$ is considered a food under reference E.290 in the European Directive on the additives no. 89-107.EEC);

argon, neon, radon, sulfur dioxide, and methane (for the formation of clathrates with water). The process of the invention may, for example, be used for the purification of water by formation of a clathrate with propane (desalination of water);

acetylene, nitrogen, nitrous oxide, nitrogen oxide, sulfur dioxide ($SO_2$) and hydrogen sulfide ($H_2S$), for the formation of clathrates with hydroquinone and its derivatives;

xenon, $CO_2$, $SO_2$, $H_2S$ (for the formation of clathrates with phenol); and argon and $SO_2$ (for the formation of clathrates with dianines).

The principle used for the formation of clathrates to obtain a mixture enriched in a given substance, even for purifying this substance, may also be used for the separation of a mixture of gases, for example, separation of a gas mixture of argon-neon by formation of a hydroquinone/argon clathrate.

In this connection, an object of the invention is to provide a process for producing, even for purifying, a gas capable of forming a clathrate with a given product, starting from a mixture comprising a plurality of gases, this process comprising a succession of the following steps:

contacting said mixture of gases with the above mentioned product, preferably in aqueous solution, until a precipitate of clathrates forms from the gases of the mixture capable of forming, possibly with a better affinity than the other gases in the mixture, a clathrate of said product, separation of the precipitate of clathrates, for example, by filtration, recovery of the gas by dissolution of the clathrate or heating.

A particular object of the present invention is to provide a process for producing cyclodextrins ($\alpha$, $\beta$ or $\gamma$) starting from a mixture of dextrins comprising cyclodextrins, linear or branched dextrins, more specifically maltodextrins, characterized in that the above mentioned mixture in aqueous solution or suspension is contacted with a gas, advantageously under pressure, until a precipitate consisting of clathrates forms between the cyclodextrins and the gas. Then the precipitate of clathrates is separated by filtration from the other components of the mixture remaining in soluble condition, and the cyclodextrins are recovered by extrusion of the gas.

The above mentioned process advantageously comprises a succession of the following steps:

possibly dissolution or suspension of the above mentioned mixture at a temperature about 70° C., in an aqueous solution, preferably under conditions close to saturation in cyclodextrins, possibly, filtration of the solution obtained to remove the insoluble matters, contacting the solution thus obtained with a gas under pressure until a precipitate of clathrates forms between cyclodextrins and the gas, isolation of the precipitate obtained during the previous step, for example, by filtration, or centrifugation, possibly followed by drying of this precipitate, possibly, solubilization of the wet precipitate obtained during the previous step and repetition of the cycle of steps described above, extrusion of the gas, for example, by dissolution of the clathrate in an aqueous solution, or by heating, possibly at a temperature from about 80° C. to a temperature higher than 100° C., possibly separation of the cyclodextrins and the other components which may be present in the solution obtained during the previous step, possibly by chromatography.

The mixture of cyclodextrins mentioned above is itself obtained by enzymatic conversion of starch, such as by means of cycloglucosyl transferase, according to known methods in this technical field.

Advantageously, with respect to enrichment in $\alpha$-cyclodextrin or production in purified form of the latter, the initial mixture used at the start of the process contains at least 25% (by weight) of $\alpha$-cyclodextrin, and preferably about 50%. By way of illustration, the determination of the percentage of $\alpha$-cyclodextrin which is present in the mixture may be carried out by high performance liquid chromatography (HPLC) according to the method described in the article of ZSADON et al., Journal of chromatography, 172 (1979) 490–492.

As indicated above, a mixture comprising $\alpha$-cyclodextrin is placed in an aqueous solution at concentrations close to saturation in $\alpha$-cyclodextrin. The quantity of mixture placed in solution is dependent on the quantity of $\alpha$-cyclodextrin which it contains, knowing that the solubility of $\alpha$-cyclodextrin is 145 g/l at room temperature.

Advantageously, the process according to the invention is carried out inside a reactor in which the mixture is introduced in aqueous solution or suspension; the air present in the reactor may be expelled, either by a series of cycles of "compression/expansion" by means of the gas used, or by a series of cycles of "vacuum/return to atmospheric pressure" by means of the gas used, then the gas is advantageously introduced under pressure.

The clathrate precipitation rate depends on the temperature, the gas pressure and the relative concentrations of the components of the mixture.

According to a preferred embodiment of the process according to the invention, precipitation of the clathrate is obtained for temperature values higher than 2° C., advantageously between 2° and 40° C., and preferably between 2° and 20° C. The gas pressures used are preferably higher than 1 bar, and more preferably are between 1 and 20 bars, advantageously between 1 and 10 bars. The time of crystallization (precipitation) is generally between 1 and 10 h.

After crystallization, the solution is filtered and the precipitate spin-dried, such as under vacuum, in order to remove the mother liquors from the initial mixture. The clathrate is then dried, preferably at relatively low temperature (lower than 40° C.), such as by means of a flow of air which passes through the bed of solid pulverulent material.

Advantageously, the reactor used is provided with a gas recovery device during the step of spin-drying. This gas may thus be used again when the process is repeated.

The clathrate thus obtained may again be placed in aqueous solution or suspension and be subjected to a new cycle of operations as described previously. The α-cyclodextrin content of the product obtained increases as a function of the number of cycles of operations carried out.

The process according to the invention corresponds to a stepped process of enrichment of a mixture comprising α-cyclodextrin, and provides in an extremely easy manner, α-cyclodextrin, (α-CD) of good purity.

DESCRIPTION OF PREFERRED EMBODIMENTS

The present invention will be explained in more detail in the following examples of the processes described above.

I Utilization of $CO_2$

A) Enrichment of a mixture initially containing 49% of α-cyclodextrin (diagram a)

Example 1

1.1. Preparation of the solution 150 g of a mixture of α-CD/maltodextrin containing 49% by weight of α-CD is placed in solution in 500 g of exchanged water. Dissolution is obtained by heating at 70° C. The traces of insoluble materials are removed by hot filtration, on a fritted material of porosity no. 3 or possibly on a filtration additive.

The solution is cooled at room temperature.

1.2. Precipitation/filtration-drying

The solution is then introduced into a reactor with a double sheath envelope of 1 l. The air present is expelled by a sequence of compression/expansion cycles, by means of $CO_2$, after which $CO_2$ is introduced under an absolute pressure of 4 bars.

Stirring of the solution is ensured either by bubbling gas or by means of a turbine. The crystallization temperature is maintained at 15° C. during 3 h. Then the precipitate is filtered on fritted material. The spin-dried precipitate is then dried by a flow of air at 35° C., during 1 h 30 min with a flow of air of 28 l/h. There is obtained 46 g of a dried product in crystalline form (having, for example, 5 to 7 molecules of water), whose content of α-CD is 77%. The weight yield is 30% and the α-CD yield is equal to 47%.

Example 2

2.1. Preparation of solution 97.4 g of product (77% of α-CD) obtained by a plurality of preparations according to example 1 are placed in solution in 496 g of exchanged water. Dissolution is obtained for a temperature of 70° C. This solution is filtrated and cooled as described in example 1.

2.2. Precipitation/filtration-drying

The solution is introduced into the same reactor as previously described. The air present is expelled by a series of compression/expansion cycles, by means of $CO_2$, after which $CO_2$ is introduced under an absolute pressure of 3 bars. Stirring of the solution is ensured either by bubbling gas or by means of a turbine. A temperature of crystallization is maintained at 17.5° C. during 1 h 30 min. Then, the clathrate is filtered and spin-dried. The damp clathrate is then recovered and dried by means of an air current at 35° C. with a flow of air of 34 l/h. There is then obtained 51.1 g of dry product, or 52% of weight yield. The content of α-CD of the product is then 84.5% of α-CD or a yield of 58%.

Example 3

3.1. Preparation of the solution 91 g of the product obtained in example no. 2 (84.5% α-CD content), are dissolved in about 410 g of exchanged water. The dissolution of the mixture is obtained as previously described.

3.2 Precipitation/filtration-drying

The solution is then introduced into the reactor and $CO_2$ is introduced as previously described. The absolute pressure of $CO_2$ is equal to 3 bars. A temperature of 18° C. is maintained during the entire duration of crystallization, i.e., 1 h 15 min. The precipitate is then filtered, spin-dried and dried in a fluid bed. There is thus obtained 60.5 g of dry product, or 66.5% of weight yield. The α-CD purity of the product obtained is 89%, i.e., a yield of 67% α-CD.

TABLE

Summarizing Results

|  | Product Used | | Conditions of Precipitation | | | Product Obtained | | |
| --- | --- | --- | --- | --- | --- | --- | --- | --- |
|  | Weight (g) | % of α-CD | $CO_2$ bar absolutes | T° °C. | Time | Weight (g) | % of α-CD | Yield α-CD |
| Example 1 | 150 | 49 | 4 | 15 | 3 h | 46 | 77 | 47 |
| Example 2 | 97.4 | 77 | 3 | 17.5 | 1 h 30 | 51.1 | 84.5 | 58 |
| Example 3 | 91 | 84.5 | 3 | 18 | 1 h 15 | 60.5 | 89 | 67 |

3.3. Depletion of the mother liquors ML1 of example 1

The mother liquors (about 42% α-CD content) of example 1 are recaptured and introduced into the reactor as described previously. The air present in the reactor is expelled by means of $CO_2$ (series of compression/expansion cycles) and the $CO_2$ is introduced under an absolute pressure of 6 bars. The beginning crystallization temperature of 15° C. is gradually brought to 12° C. during 5 h. The duration of crystallization is 5 h. The precipitate thus obtained is filtered and dried. 9 g of dry product with 73% purity of α-CD are collected. The weight yield is 8% and the α-CD yield is 15%.

DIAGRAM a)

Example: mixture of α-CD/maltodextrin (49%)
= initial mixture

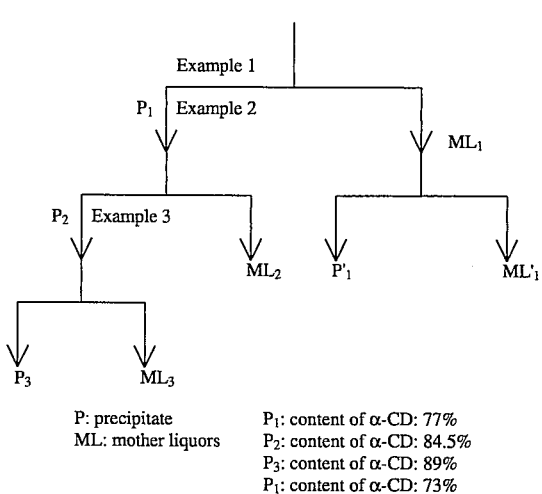

P: precipitate
ML: mother liquors $P_1$: content of α-CD: 77%
$P_2$: content of α-CD: 84.5%
$P_3$: content of α-CD: 89%
$P'_1$: content of α-CD: 73%

B) Enrichment of a mixture initially containing 35% α-CD

2.1 Preparation of the solution 137 g of a mixture containing 35% by weight of α-CD (or 48 g of α-CD) are placed in solution in 500 g of exchanged water. The stirred solution is thereafter solubilized by heating (T°:40° C.). The solution thus obtained is not filtered.

2.2 Precipitation/filtration-drying

The solution previously obtained is introduced into the reactor and a gas pressure is obtained as previously described. The absolute pressure of $CO_2$ is 6 bars. The medium temperature of 20° C. is gradually brought to 8° C. during 2 h 30 min and is kept at 8° C. during an additional 3 h 10 min. The precipitate is then dried. There are obtained 24 g of dry product. The weight yield is equal to 17%. The content of α-CD of the precipitate obtained is 80% or an α-CD yield of 40%.

II Utilization of Ethylene

A solution containing 278 g of a mixture containing 49 weight % of α-CD is introduced into the reactor previously described. The reactor is then flushed by reducing the pressure and introduction of nitrogen, then ethylene is introduced under an absolute pressure of 2 bars. After 1 h 50 min, the pressure of ethylene is increased to 2.5 bars and maintained constant until the end of the handling operation. The crystallization temperature is initially 30° C. and is gradually brought to 12° C. during 4 h 30 min. The precipitate is then filtered, then spin-dried and dried. There are then obtained 87.7 g of dry product, or a weight yield of 32%. The content of α-CD in the product is 79.4% or an α-CD yield of 50%.

III Utilization of Nitrous Oxide

4.1 Preparation of the solution 285 g of mixture, in which the α-CD content is 49%, are solubilized at a temperature of 60° C. in 660 of exchanged water. A cooled solution is then filtered on a fritted material.

4.2 Precipitation/filtration-drying

The solution previously obtained is introduced into the reactor. Air is expelled by placing under vacuum and nitrous oxide is introduced. The absolute gas pressure is 4 bars and is kept constant throughout the precipitation. The temperature, 30° C. at the start, is gradually brought to 12° C. The time of precipitation is 4 h 25 min. The precipitate is then filtered, and spin-dried. After drying, 99.8 g of dry product are obtained in which the content of α-CD is 84%, or a weight yield of 35%. The yield with respect to α-CD is 58%.

We claim:

1. A process for purification of a first substance, said first substance being a cyclodextrin capable of forming a clathrate with a gas from a mixture comprising said first substance and other components, said process comprising the following steps:

contacting said mixture with at least one non-toxic and non-flammable gas, in the absence of substantially any substance, other than said at least one gas, that forms a clathrate with said first substance that will precipitate from said mixture, until a precipitate of clathrates is formed comprised of said first substance and the at least one gas;

separating said precipitate of clathrates from said other components remaining in said mixture;

and recovering said first substance with no content of said other substance.

2. The process according to claim 1, wherein said steps are repeated at least one time with the recovered first substance.

3. The process according to claim 1, wherein said process purifies the first substance from the mixture, and the mixture is either a solution or a suspension with other components.

4. The process according to claim 1, wherein said first substance is α-cyclodextrin, and wherein a mixture enriched in α-cyclodextrin is obtained from a mixture having a lower initial concentration of α-cyclodextrin.

5. The process according to claim 1, further comprising a step of purification of the recovered first substance.

6. The process according to claim 5, wherein said purification is carried out by chromatography.

7. The process according to claim 1, wherein said mixture is a suspension.

8. The process according to claim 1, wherein said mixture is an aqueous solution.

9. The process according to claim 1, wherein said mixture is contacted with said at least one gas at more than atmospheric pressure.

10. The process according to claim 1, wherein said separating is carried out by filtration.

11. The process according to claim 1, wherein said substance is α-cyclodextrin.

12. The process according to claim 11, wherein said at least one gas is selected from the group consisting of nitrous oxide and carbon dioxide.

13. The process according to claim 1, wherein said at least one gas comprises nitrous oxide.

14. The process according to claim 1, wherein said at least one gas comprises carbon dioxide.

15. A process for the purification of α-cyclodextrins from a mixture comprising said α-cyclodextrins, said process comprising:

contacting said mixture with at least one non-toxic and non-flammable gas under pressure, in the absence of substantially any substance, other than said at least one gas, that forms a clathrate with said α-cyclodextrins that will precipitate from said mixture, until a precipitate of clathrates forms between the α-cyclodextrins and at least one gas;

isolating said precipitate, and recovering said α-cyclodextrins from the precipitate with no content of said other substance.

16. The process according to claim 15, wherein said mixture of α-cyclodextrin contains at least 25 wt. % α-cyclodextrin.

17. The process according to claim 15, wherein the mixture is placed in an aqueous solution at about a saturation concentration of α-cyclodextrin.

18. The process according to claim 15, wherein the precipitation of said clathrate occurs at a temperature of greater than about 2° C.

19. The process according to claim 15, wherein the gas pressure is greater than about 1 bar.

20. The process according to claim 15, wherein said mixture is a suspension.

21. The process according to claim 15, wherein said mixture is an aqueous solution.

22. The process according to claim 15, wherein said mixture further comprises maltodextrins.

23. The process according to claim 15, wherein said mixture is heated to about 70° C.

24. The process according to claim 15, further comprising removing insoluble components from said mixture prior to said contacting step.

25. The process according to claim 24, wherein said insoluble components are removed by filtration.

26. The process according to claim 15, wherein said mixture contains about 50 wt. % of α-cyclodextrin.

27. The process according to claim 15, wherein the clathrate precipitate forms at a temperature of between 2° and 40° C.

28. The process according to claim 15, wherein the precipitation of said clathrate occurs at a temperature of between about 2° and 20° C.

29. The process according to claim 15, wherein said pressure is between about 1 and 20 bar.

30. The process according to claim 15, wherein said pressure is between about 1 and 10 bar.

31. The process according to claim 15, further comprising repeating, at least once, said removing, contacting filtering and recovering steps.

32. A process according to claim 15, wherein said at least one gas comprises carbon dioxide.

* * * * *